United States Patent
Nabata et al.

(10) Patent No.: US 9,143,867 B2
(45) Date of Patent: Sep. 22, 2015

(54) ELECTRONIC DEVICE

(71) Applicant: KYOCERA CORPORATION, Kyoto-shi Kyoto (JP)

(72) Inventors: Toshihisa Nabata, Sagamihara (JP); Satoshi Mizuta, Sagamihara (JP); Tomoaki Miyano, Kameyama (JP); Kiyokazu Sato, Yokohama (JP); Akio Kihara, Kawasaki (JP); Shun Kazama, Yokohama (JP); Yasuhiro Katayama, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/002,698

(22) PCT Filed: Mar. 28, 2013

(86) PCT No.: PCT/JP2013/002138
§ 371 (c)(1),
(2) Date: Sep. 23, 2014

(87) PCT Pub. No.: WO2013/145758
PCT Pub. Date: Oct. 3, 2013

(65) Prior Publication Data
US 2015/0030188 A1    Jan. 29, 2015

(30) Foreign Application Priority Data

Mar. 29, 2012 (JP) ................................. 2012-077714

(51) Int. Cl.
*H04R 17/00* (2006.01)
*H04M 1/03* (2006.01)
(Continued)

(52) U.S. Cl.
CPC ............... *H04R 17/00* (2013.01); *H04M 1/035* (2013.01); *H04R 1/02* (2013.01); *H04R 7/06* (2013.01); *H04R 7/045* (2013.01); *H04R 2400/03* (2013.01); *H04R 2499/11* (2013.01)

(58) Field of Classification Search
CPC .... H04R 2499/15; H04R 7/045; H04R 17/00; H04R 2440/05; H04R 2499/11
USPC .......................................................... 381/151
See application file for complete search history.

(56) References Cited

U.S. PATENT DOCUMENTS 3,728,741 A    4/1973  Lepor
6,259,188 B1   7/2001  Woodard et al.
(Continued)

FOREIGN PATENT DOCUMENTS

EP    1542064 A1    6/2005
JP    62-086799 U   6/1987
(Continued)

OTHER PUBLICATIONS

An Office Action issued by the Japanese Patent Office on Aug. 28, 2012, which corresponds to Japanese Patent Application No. 2012-148834 and is related to U.S. Appl. Nos. 14/002,357 and 14/002,698.
(Continued)

*Primary Examiner* — Duc Nguyen
*Assistant Examiner* — George Monikang
(74) *Attorney, Agent, or Firm* — Studebaker & Brackett PC

(57) ABSTRACT

Provided is an electronic device including: a piezoelectric element; a vibration plate to which the piezoelectric element is joined for vibration; and a housing to which the vibration plate is joined. Vibration sound, which is transmitted by vibrating a part of a human body, is generated by the vibration plate. The vibration plate includes, in a plan view thereof, a first area including a joining portion with the piezoelectric element and a second area located further away from the joining portion than the first area is, and rigidity in a first area is lower than rigidity in the second area. With the above configuration, sound leakage or the like is reduced, and usability of the electronic device is improved.

23 Claims, 6 Drawing Sheets

(51) Int. Cl.
*H04R 7/06* (2006.01)
*H04R 1/02* (2006.01)
*H04R 7/04* (2006.01)

(56) References Cited

U.S. PATENT DOCUMENTS

| | | | |
|---|---|---|---|
| 6,427,017 | B1 | 7/2002 | Toki |
| 7,050,600 | B2 | 5/2006 | Saiki et al. |
| 7,174,025 | B2 | 2/2007 | Azima et al. |
| 7,421,088 | B2 | 9/2008 | Cranfill et al. |
| 7,512,425 | B2 | 3/2009 | Fukuda |
| 7,657,042 | B2 | 2/2010 | Miyata |
| 8,199,959 | B2 | 6/2012 | Miyata |
| 8,200,289 | B2 | 6/2012 | Joo et al. |
| 8,279,623 | B2 | 10/2012 | Idzik et al. |
| 8,848,967 | B2 | 9/2014 | Joo |
| 2001/0026625 | A1 | 10/2001 | Azima et al. |
| 2002/0065113 | A1 | 5/2002 | Mori |
| 2002/0067841 | A1 | 6/2002 | Bank et al. |
| 2002/0076061 | A1 | 6/2002 | Ashtiani et al. |
| 2004/0109571 | A1 | 6/2004 | Yoshimine |
| 2005/0002537 | A1 | 1/2005 | Azima et al. |
| 2005/0057527 | A1 | 3/2005 | Takenaka et al. |
| 2005/0129267 | A1 | 6/2005 | Azima et al. |
| 2005/0169112 | A1 | 8/2005 | Shimizu |
| 2006/0093165 | A1 | 5/2006 | Kamimura et al. |
| 2006/0140424 | A1 | 6/2006 | Kobayashi |
| 2006/0227981 | A1 | 10/2006 | Miyata |
| 2006/0286998 | A1 | 12/2006 | Fukuda |
| 2007/0057909 | A1 | 3/2007 | Schobben et al. |
| 2007/0097073 | A1 | 5/2007 | Takashima et al. |
| 2008/0268921 | A1 | 10/2008 | Taniguchi et al. |
| 2009/0103767 | A1 | 4/2009 | Kuroda et al. |
| 2009/0147969 | A1 | 6/2009 | Kinouchi et al. |
| 2009/0290746 | A1 | 11/2009 | Miyata |
| 2009/0296976 | A1 | 12/2009 | Tsai et al. |
| 2010/0225600 | A1 | 9/2010 | Dai et al. |
| 2010/0278362 | A1 | 11/2010 | Kim |
| 2011/0234459 | A1 | 9/2011 | Yabe |
| 2013/0051585 | A1 | 2/2013 | Karkkainen et al. |
| 2013/0308798 | A1 | 11/2013 | Lee |
| 2014/0342783 | A1 | 11/2014 | Suzuki et al. |

FOREIGN PATENT DOCUMENTS

| | | |
|---|---|---|
| JP | H07-296786 A | 11/1995 |
| JP | H08-223675 A | 8/1996 |
| JP | 09-247795 A | 9/1997 |
| JP | H11-25940 A | 1/1999 |
| JP | 2001-007546 A | 1/2001 |
| JP | 2002-027065 A | 1/2002 |
| JP | 2002-185593 A | 6/2002 |
| JP | 2002-219413 A | 8/2002 |
| JP | 2002-232542 A | 8/2002 |
| JP | 2002-305569 A | 10/2002 |
| JP | 2004-187031 A | 7/2004 |
| JP | 2005-214793 A | 8/2005 |
| JP | 2005-236352 A | 9/2005 |
| JP | 2005-284054 A | 10/2005 |
| JP | 2005-348193 A | 12/2005 |
| JP | 2007-502594 A | 2/2007 |
| JP | 2007-082009 A | 3/2007 |
| JP | 2007-180827 A | 7/2007 |
| JP | 2007-189578 A | 7/2007 |
| JP | 2008-017398 A | 1/2008 |
| JP | 2008-270879 A | 11/2008 |
| JP | 2009-118396 A | 5/2009 |
| JP | 2011-091719 A | 5/2011 |
| JP | 2013-110535 A | 6/2013 |
| JP | 5255142 B1 | 8/2013 |
| JP | 2013-207795 A | 10/2013 |
| JP | 2013-207796 A | 10/2013 |
| JP | 2013-223238 A | 10/2013 |
| JP | 2013-232874 A | 11/2013 |
| JP | 2013-255212 A | 12/2013 |
| KR | 10-1068254 B1 | 9/2011 |
| WO | 2004/023199 A1 | 3/2004 |
| WO | 2004/051967 A1 | 6/2004 |
| WO | 2006/059679 A1 | 6/2006 |
| WO | 2006/114985 A1 | 11/2006 |
| WO | 2012/025783 A1 | 3/2012 |

OTHER PUBLICATIONS

An Office Action issued by the Japanese Patent Office on Feb. 5, 2013, which corresponds to Japanese Patent Application No. 2012-148834 and is related to U.S. Appl. Nos. 14/002,357 and 14/002,698.

An Office Action issued by the Japanese Patent Office on Apr. 23, 2013, which corresponds to Japanese Patent Application No. 2012-148834 and is related to U.S. Appl. Nos. 14/002,357 and 14/002,698.

An Office Action issued by the Japanese Patent Office on Aug. 26, 2014, which corresponds to Japanese Patent Application No. 2014-016081 and is related to U.S. Appl. Nos. 14/002,357 and 14/002,698.

An Office Action issued by the Japanese Patent Office on Aug. 26, 2014, which corresponds to Japanese Patent Application No. 2014-016048 and is related to U.S. Appl. Nos. 14/002,668 and 14/002,698.

An Office Action issued by the Japanese Patent Office on Jul. 31, 2012, which corresponds to Japanese Patent Application No. 2012-148844 and is related to U.S. Appl. Nos. 14/002,668 and 14/002,698.

An Office Action issued by the Japanese Patent Office on Jan. 8, 2013, which corresponds to Japanese Patent Application No. 2012-148844 and is related to U.S. Appl. Nos. 14/002,668 and 14/002,698.

An Office Action issued by the Japanese Patent Office on Jul. 31, 2012, which corresponds to Japanese Patent Application No. 2012-148798 and is related to U.S. Appl. Nos. 14/002,675 and 14/002,698.

An Office Action issued by the Japanese Patent Office on Jan. 8, 2013, which corresponds to Japanese Patent Application No. 2012-148798 and is related to U.S. Appl. Nos. 14/002,675 and 14/002,698.

An Office Action issued by the Japanese Patent Office on Apr. 23, 2013, which corresponds to Japanese Patent Application No. 2012-148798 and is related to U.S. Appl. Nos. 14/002,675 and 14/002,698.

An Office Action issued by the Japanese Patent Office on Jul. 31, 2012, which corresponds to Japanese Patent Application No. 2012-148773 and is related to U.S. Appl. Nos. 14/002,699 and 14/002,698.

An Office Action issued by the Japanese Patent Office on Jan. 8, 2013, which corresponds to Japanese Patent Application No. 2012-148773 and is related to U.S. Appl. Nos. 14/002,699 and 14/002,698.

International Search Report; PCT/JP2013/002789; issued on Jun. 11, 2013, which corresponds to U.S. Appl. Nos. 14/002,357 and 14/002,698.

International Search Report; PCT/JP2013/002088; issued on May 14, 2013, which corresponds to U.S. Appl. Nos. 14/002,668 and 14/002,698.

International Search Report; PCT/JP2013/002530; issued on May 14, 2013, which corresponds to U.S. Appl. Nos. 14/002,675 and 14/002,698.

International Search Report; PCT/JP2013/002874; issued on May 14, 2013, which corresponds to U.S. Appl. Nos. 14/002,699 and 14/002,698.

The extended European search report issued by the European Patent Office on Jun. 11, 2013, which corresponds to European Patent Application No. 13163442.0 and is related to U.S. Appl. Nos. 13/862,333 and 14/002,698.

International Search Report; PCT/JP2013/002874 issued on Jun. 11, 2013.

International Search Report; PCT/JP2013/002138 issued on May 14, 2013.

Japanese Office Action, JP2012-148809, Jul. 31, 2012.

Japanese Office Action. JP2012-148809, Jan. 8, 2013.

An Office Action; "Notice of Reasons for Rejection," issued by the Japanese Patent Office on Dec. 2, 2014, which corresponds to Japanese Patent Application No. 2014-016082 and is related to U.S. Appl. No. 14/002,675 and U.S. Appl. No. 14/002,698; with English language concise explanation.

(56) References Cited

OTHER PUBLICATIONS

An Office Action; "Notice of Reasons for Rejection," issued by the Japanese Patent Office on Dec. 2, 2014, which corresponds to Japanese Patent Application No. 2014-016046 and is related to U.S. Appl. No. 14/002,698; with English language concise explanation.

An Office Action; "Notice of Reasons for Rejection," issued by the Japanese Patent Office on Mar. 17, 2015, which corresponds to Japanese Patent Application No. 2014-016048 and is related to U.S. Appl. No. 14/002,668 and U.S. Appl. No. 14/002,698; with English language concise explanation.

An Office Action; "Notice of Reasons for Rejection," issued by the Japanese Patent Office on Feb. 10, 2015, which corresponds to Japanese Patent Application No. 2012-089203 and is related to U.S. Appl. No. 13/860,150 and U.S. Appl. No. 14/002,698; with English language concise explanation.

An Office Action; "Notice of Reasons for Rejection," issued by the Japanese Patent Office on Mar. 24, 2015, which corresponds to Japanese Patent Application No. 2012-091021 and is related to U.S. Appl. No. 13/862,333 and U.S. Appl. No. 14/002,698; with English language concise explanation.

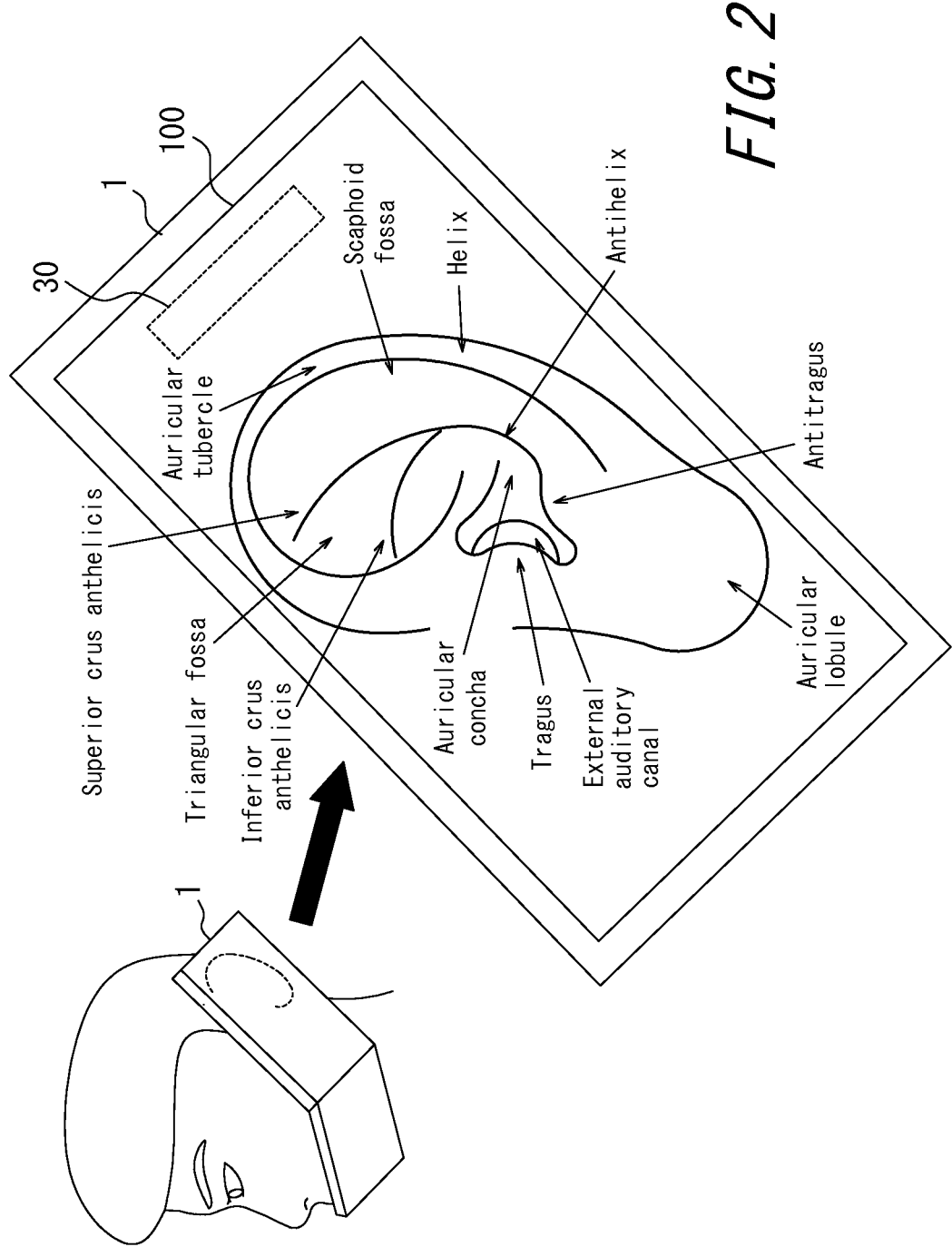

ELECTRONIC DEVICE

CROSS-REFERENCE TO RELATED APPLICATION

This application claims priority to and the benefit of Japanese Patent Application No. 2012-077714 filed on Mar. 29, 2012, the entire contents of which are incorporated herein by reference.

FIELD

The present invention relates to an electronic device that vibrates a vibration plate by applying a predetermined electric signal (i.e. a sound signal) to a piezoelectric element and that transfers the vibration of the vibration plate to a human body to thereby transmit vibration sound to a user.

BACKGROUND

Patent Literature 1 listed below describes that air conduction sound and bone conduction sound are known as sound that is transmitted from an electronic device such as a mobile phone to a human being. It is also described that air conduction sound is sound perceived by an auditory nerve of a user as a result of an eardrum being vibrated by an air vibration that is created by a vibration of an object and that travels through an external auditory canal down to the eardrum. Furthermore, it is described that bone conduction sound is transmitted to the auditory nerve of the user through a part of a user's body (e.g. a cartilaginous portion of an external ear) that is in contact with the vibrating object.

Patent Literature 1 also describes that, in a mobile phone that transmits sound to the user by air conduction sound and bone conduction sound, a rectangular plate-shaped vibration body configured by piezoelectric bimorph and a flexible material is attached to an outer surface of a housing via an elastic member. It is also described that upon application of a voltage to the piezoelectric bimorph of the vibration body, the piezoelectric bimorph is expanded and contracted in a longitudinal direction, thereby vibrating the vibration body. Furthermore, it is described that, when the user places the vibration body in contact with an auricle, air conduction sound and bone conduction sound are transmitted to the user.

CITATION LIST

Patent Literature 1: Japanese Patent Application Publication No. 2005-348193

SUMMARY

According to the electronic device described in Patent Literature 1, the small rectangular vibration body with a size of approximately 0.8 cm in vertical width and approximately 3.2 cm in horizontal width is attached to the outer surface of the housing of the mobile phone or the like. Patent Literature 1 does not even suppose a problem that arises when the vibration body is larger than the above size.

The present invention is to provide an electronic device that may be appropriately used even when the vibration body larger than a vibration body with the dimension of approximately 0.8 cm by 3.2 cm is employed.

One aspect of the present invention provides an electronic device including: a piezoelectric element; a vibration plate to which the piezoelectric element is joined for vibration; and a housing to which the vibration plate is joined. Vibration sound, which is transmitted by vibrating a part of a human body, is generated by the vibration plate. The vibration plate includes, in a plan view of it, a first area including a joining portion with the piezoelectric element and a second area located further away from the joining portion than the first area is, and rigidity in a first area is lower than rigidity in the second area.

According to a preferred embodiment, the vibration plate includes two panels configured to be joined together, and a joining portion of the panels is located in the second area.

According to another preferred embodiment, one of the two panels comprises a display panel, and another one of the two panels comprises a touch panel or a protection panel disposed on an opposite side of the housing relative to the display panel.

According to yet another preferred embodiment, the vibration plate has a length in a first direction that is greater than or equal to a length from an antitragus to an inferior crus of antihelix, the first direction extending from the joining portion with the piezoelectric element included in the first area to the second area.

According to yet another preferred embodiment, the vibration plate has a length in a second direction that is greater than or equal to a length from a tragus to an antihelix, the second direction intersecting with the first direction extending from the joining portion with the piezoelectric element included in the first area to the second area.

According to yet another preferred embodiment, the piezoelectric element is joined to the vibration plate by a joining member, such as a non-thermosetting adhesive agent, a double-sided adhesive tape, or the like.

According to yet another preferred embodiment, the vibration plate is joined to the housing by a joining member, such as a non-thermosetting adhesive agent, a double-sided adhesive tape, or the like.

According to yet another preferred embodiment, the vibration plate forms a part or an entirety of any of a display unit, an input unit, a cover of the display unit, and a lid portion that allows a battery to be detachable.

According to yet another preferred embodiment, the joining portion with the piezoelectric element in the vibration plate is located outside of an area where the touch panel covers the display panel.

The electronic device according to the present invention may be appropriately used even when the vibration body larger than a vibration body with the dimension of approximately 0.8 cm by 3.2 cm is employed. Furthermore, vibration sound and air conduction sound may be generated by the vibration plate.

BRIEF DESCRIPTION OF DRAWINGS

The present invention will be further described below with reference to the accompanying drawings, wherein:

FIG. 2 illustrates a state where an electronic device is used;

DESCRIPTION OF EMBODIMENTS

Figure 1:
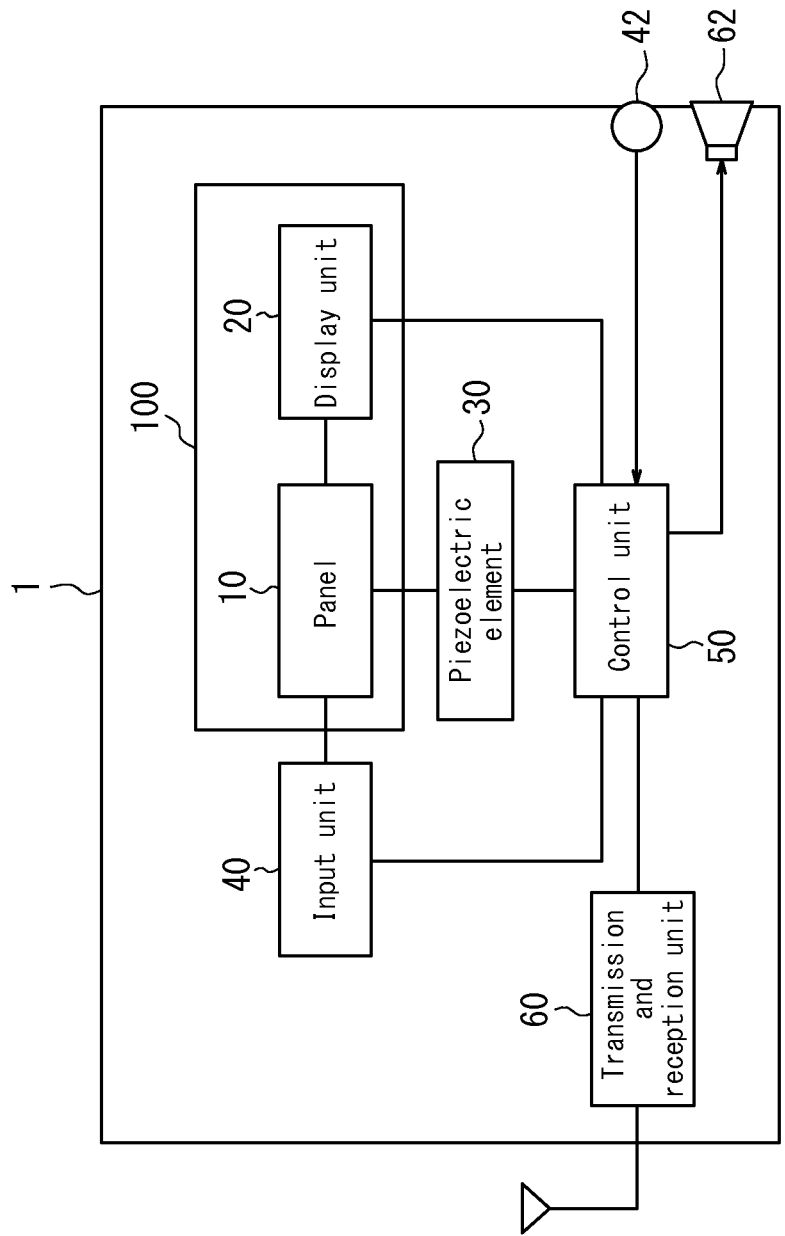
FIG. 1 is a function block diagram of an electronic device according to one embodiment of the present invention.

Embodiments of the present invention will be described with reference to the accompanying drawings. FIG. 1 is a function block diagram of an electronic device 1 according to one embodiment of the present invention. The electronic device 1, which is a mobile phone (smartphone), for example, includes a vibration plate 100 (including a panel 10 and a display unit 20), a piezoelectric element 30, an input unit 40, and a control unit 50.

The panel 10 may be a touch panel configured to detect a contact, a cover panel configured to protect the display unit 20, or the like. The panel 10 may be made of glass or a synthetic resin such as acryl. The panel 10 preferably has a plate shape. When the panel 10 is the touch panel, the panel 10 detects a contact made by a finger of a user, a pen, a stylus pen, or the like. The touch panel may detect a contact using any type, such as the capacitive type, the resistive film type, a surface acoustic wave type (or an ultrasonic type), an infrared type, an electromagnetic induction type, a load detection type, and the like.

The display unit 20 is a panel display device such as a liquid crystal display, an organic EL display, and an inorganic EL display. The display unit 20 is disposed on a back surface of the panel 10 as described later below. The display unit 20 may be adhered and fixed to the panel 10 using a joining member (e.g. an adhesive agent). The joining member may be an elastic resin (e.g. an optical elastic resin) with a controlled refractive index for light transmitted therethrough. The display unit 20 displays various information through the joining member and the panel 10.

The piezoelectric element 30 is an element that is configured to undergo expansion and contraction in accordance with an electromechanical coupling factor of a constituent material in response to an electric signal (voltage) applied thereto. As a material of the element, ceramic and crystal are used, for example. The piezoelectric element 30 may be a unimorph, a bimorph, or a laminated piezoelectric element. The laminated piezoelectric element includes a laminated bimorph element in which layers (e.g. 16 or 24 layers) of bimorph are laminated. The laminated piezoelectric element is configured by a laminated of a plurality of dielectric layers made of PZT (lead zirconate titanate) and electrode layers each disposed between adjacent ones of the dielectric layers, for example.

The piezoelectric element 30 is disposed on the back surface of the panel 10. The piezoelectric element 30 is attached to the panel 10 by a joining member (e.g. a double-sided adhesive tape). The piezoelectric element 30 undergoes expansion and contraction in response to an electric signal applied thereto, and accordingly, the panel 10 is deformed. As a result, the vibration plate 100, which includes the panel 10 and the display unit 20, is vibrated in accordance with frequency(ies) or the like of the electric signal.

The input unit 40 is configured to receive an operation input from the user and is configured using an operation button (an operation key), for example. When the panel 10 is the touch panel, the panel 10 also functions as an input unit that is capable of receiving an operation input from the user by detecting a contact made by the user.

The control unit 50 is a processor configured to control the electronic device 1 and apply a predetermined electric signal (voltage in accordance with a sound signal) to the piezoelectric element 30. For example, the voltage applied to the piezoelectric element 30 may be ±15 V which is greater than ±5 V, that is, a voltage to be applied to a so-called panel speaker configured for sound conduction not using human body vibration sound but using air conduction sound. With the above configuration, even when the user forcefully presses the vibration plate 100 against a user's body with force greater than or equal to 3 N, the vibration of the vibration plate 100 occurs. As a result, human body vibration sound which is transmitted through a part of the user's body is generated. Note that a level of the voltage to be applied is appropriately adjustable in accordance with how tightly the panel is fixed or in accordance with a capability of the element. When the control unit 50 applies an electric signal to the piezoelectric element 30, the piezoelectric element 30 undergoes expansion and contraction in a longitudinal direction, and the vibration plate 100 is vibrated. The panel 10 undergoes flexure in response to expansion and contraction or flexure of the piezoelectric element 30. The panel 10 is bent directly by the piezoelectric element 30. The state in which the "panel 10 is bent directly by the piezoelectric element 30" differs from a phenomenon in which the panel is deformed when pressing force is applied to a certain area of the panel due to inertial force of a piezoelectric actuator including the piezoelectric element provided in a casing as adopted in an existing panel speaker. The state in which the "panel 10 is bent directly by the piezoelectric element 30" includes a state in which the panel is bent directly by expansion and contraction or bending (flexure) of the piezoelectric element via the joining member or via the joining member and a reinforcing member. Thus, the vibration plate 100 generates air conduction sound, and the vibration plate 100 also generates bone conduction sound that is transmitted through a part of the body when the user places the part of the body (e.g. the cartilaginous portion of the external ear) in contact with the vibration plate 100. For example, the control unit 50 may cause a transmission and reception unit 60, which receives through wireless communication an electric signal corresponding to a sound signal representing voice of a party on the phone, music including a phone melody or a tune, or the like, to apply the received electric signal to the piezoelectric element 30. By doing so, air conduction sound and bone conduction sound that correspond to the sound signal may be generated. The sound signal according to the electric signal may be based on music data stored in an internal memory or may be reproduced in accordance with music data stored in an external server and the like via the network.

The control unit 50 also converts the sound signal collected by a microphone 42 into a baseband signal and causes the transmission and reception unit 60 to transmit the baseband signal to an electronic device of the party on the phone. It is also possible to additionally provide the electronic device 1 with a dynamic speaker 62, so that the control unit 50 outputs various sound signals to the dynamic speaker 62.

The vibration is caused in an area of the vibration plate 100 where the piezoelectric element 30 is joined to the panel 10 and in other areas of the vibration plate 100 that are away from the area where the piezoelectric element 30 is joined. The vibration plate 100 is vibrated such that areas with relatively large amplitude of vibration and areas with relatively small amplitude of vibration are distributed randomly or in a cyclic manner across the vibration plate 100 at a certain moment. That is to say, the vibration plate 100 includes, in areas thereof that are vibrated, a plurality of portions that are configured to be vibrated in a direction intersecting with a main surface of the vibration plate 100. The vibration of a plurality of wavelengths is detected such that, in each of the plurality of portions, a value indicating amplitude of the vibration transitions over time from plus to minus or vice versa. The above configuration allows the user to listen to sound while placing the ear in contact with the areas of the vibration plate 100 that are away from the area where the piezoelectric element 30 is joined, as illustrated in FIG. 2, for example.

In this regard, as illustrated in FIG. 2, the vibration plate 100 may be as large as the user's ear or may be larger than the user's ear. In the above cases, when the user listens to sound, the whole ear tends to be covered by the vibration plate 100 of the electronic device 1. As a result, ambient sound (noise) is prevented from entering through the external auditory canal. It is suffice for the vibration to occur in an area of the vibration plate 100 that is larger than an area having a length corresponding to a distance from a helix to a tragus and an antitragus and a width corresponding to a distance from a crus helicis to an antihelix. Average ear size of the Japanese can be seen from the Japanese Body Dimension Database (1992-1994) or the like distributed by the Research Institute of Human Engineering for Quality Life (HQL). The vibration plate 100 with a size greater than or equal to the average ear size of the Japanese would be generally capable of covering a whole ear of a foreigner as well.

The above electronic device 1 is capable of transmitting, to the user, air conduction sound and human body vibration sound that is transmitted through a part of the user's body (e.g. the cartilaginous portion of the external ear). Accordingly, less volume of sound propagates to an external environment due to the vibration of air, compared to a case of the dynamic receiver. Accordingly, the electronic device 1 is preferable for a situation where a recorded message is listened to on the train and the like, for example.

Furthermore, since the above electronic device 1 transmits human body vibration sound by the vibration of the vibration plate 100, even when the user wears an earphone or a headphone, the user is able to listen to sound though the earphone or the headphone and a portion of the body by placing the electronic device 1 in contact with the earphone and the headphone.

The above electronic device 1 transmits sound to the user by the vibration of the vibration plate 100. Accordingly, in a case where the electronic device 1 is not provided with an additional dynamic speaker, it is not necessary to provide the housing with an opening (i.e. a sound discharge opening) for sound transmission. As a result, a waterproof structure of the electronic device is simplified. When the electronic device 1 is provided with the additional dynamic speaker, the sound discharge opening may be closed by a member that passes air through and blocks liquid. The member that passes air through and blocks liquid may be Gore-Tex™, for example.

First Embodiment

Figure 3A:
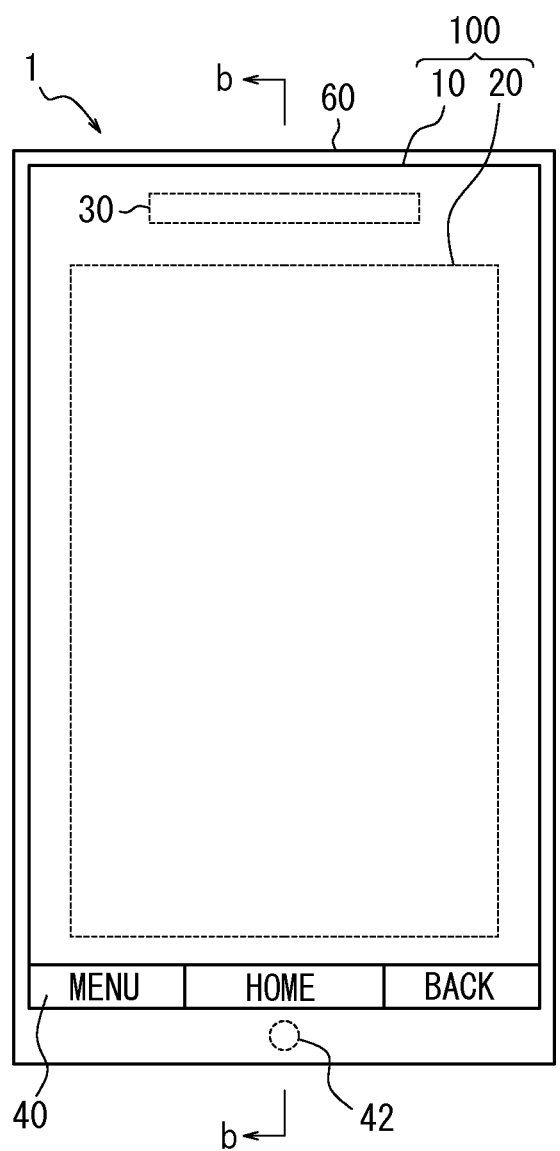
FIGS. 3A and 3B illustrate a housing structure of an electronic device according to another embodiment.
Figure 3B:
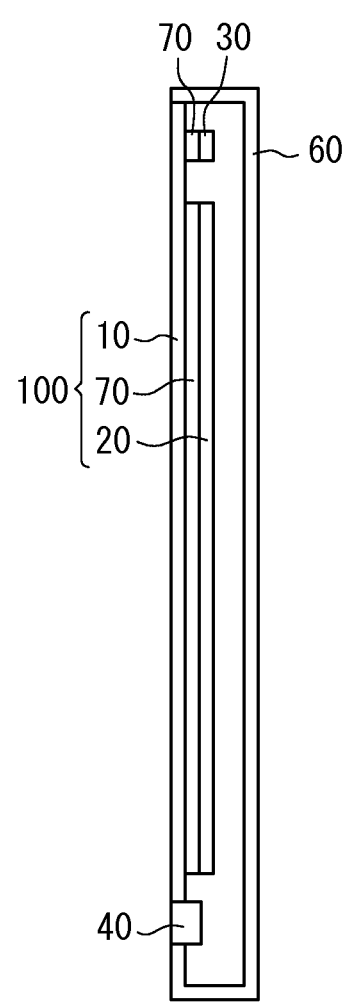

FIGS. 3A and 3B illustrate the housing structure of the electronic device 1 according to a first embodiment. FIG. 3A is a front view, and FIG. 3B is a sectional view taken along a line b-b of FIG. 3A. The electronic device 1 illustrated in FIGS. 3A and 3B is a smartphone in which the touch panel, i.e., a glass plate, is disposed as the panel 10 on a front surface of a housing 60 (e.g. a metal or a resin casing). The panel 10 and the input unit 40 are supported by the housing 60, and the display unit 20 and the piezoelectric element 30 are each adhered to the panel 10 by a joining member 70. Note that the joining member 70 may be the adhesive agent, the double-sided adhesive tape, or the like having thermosetting properties, ultraviolet-curable properties, or the like. For example, the joining member 70 may be an optical elastic resin, which is a colorless and transparent ultraviolet-curable acrylic adhesive agent. The panel 10, the display unit 20, and the piezoelectric element 30 each have a substantially rectangular shape.

The display unit 20 is joined to the panel 10 by the joining member 70, and the panel 10 and the display unit 20 form the vibration plate 100. Note that the joining member 70 may be the adhesive agent having thermosetting properties, ultraviolet-curable properties, or the like. For example, the joining member 70 may be an optical elastic resin, which is a colorless and transparent ultraviolet-curable acrylic adhesive agent. The display unit 20 is joined to the back surface of the panel 10. Preferably, the display unit 20 is adhered to the panel 10 over substantially an entire surface area where the display unit 20 is in contact with the panel 10. With the above structure, rigidity of the vibration plate 100 is increased in a portion thereof where the display unit 20 is joined to the panel 10.

The panel 10 is joined to the housing 60 by a joining member. Using the joining member prevents the vibration of the vibration plate 100 from being transmitted directly to the housing 60, thereby reducing the vibration of the housing 60 itself compared to a case where the vibration of the vibration plate 100 is transmitted directly to the housing 60. Consequently, the user is less likely to drop the electronic device 1 due to a large vibration of the housing 60. Furthermore, by using as the joining member the adhesive agent having thermosetting properties, ultraviolet-curable properties, or the like, for example, joining is achieved in a manner such that contraction due to a thermal stress is less likely to occur between the vibration plate 100 and the housing 60. By using as the joining member the double-sided adhesive tape, for example, a contraction stress to the piezoelectric element 30 is reduced compared to the case where the adhesive agent is used.

The piezoelectric element 30 is also adhered to the panel 10 by the joining member 70. By using the adhesive agent having thermosetting properties, ultraviolet-curable properties, or the like as the joining member 70, joining is achieved in a manner such that contraction due to the thermal stress is less likely to occur between the piezoelectric element 30 and the vibration plate 100. The double-sided adhesive tape may also be used as the joining member 70. By using the double-sided adhesive tape, the contraction stress to the piezoelectric element 30 is reduced compared to the case where the adhesive agent is used.

The display unit 20 is disposed in substantially a middle of the panel 10 in a short-side direction thereof. The piezoelectric element 30 is disposed near an end of the panel 10 in the longitudinal direction of the panel 10 at a predetermined distance from the end such that the longitudinal direction of the piezoelectric element 30 extends along a short side of the panel 10. The display unit 20 and the piezoelectric element 30 are disposed side by side in a direction parallel to a surface of an inner side of the panel 10. By disposing the piezoelectric element 30 outside of the area where the panel 10 covers the display unit 20, display by the display unit 20 is prevented from being interfering with by the piezoelectric element 30.

Figure 4:
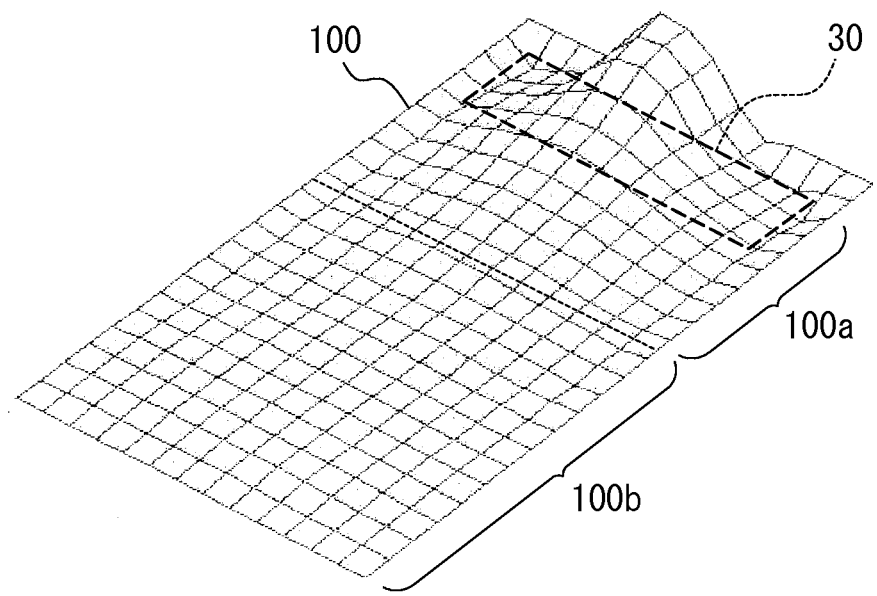
FIG. 4 illustrates one example of a vibration of a vibration plate in the electronic device according to the other embodiment.
Figure 5:
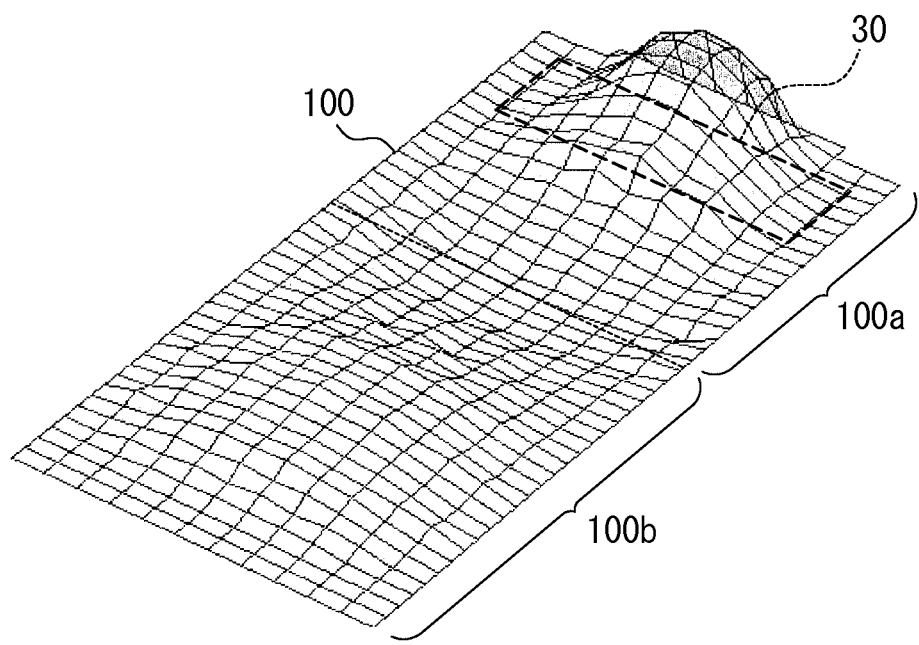
FIG. 5 illustrates one example of a vibration of a vibration plate when a display unit is not joined to a panel.

FIG. 4 illustrates one example of the vibration of the vibration plate 100 included in the electronic device 1 according to the first embodiment. On the other hand, FIG. 5 illustrates one example of the vibration plate 100 not provided with the display unit 20, in other words, one example of the vibration of the panel 10 in which the display unit 20 is not adhered to the back surface but supported by the housing 60. In the electronic device 1 according to the first embodiment, the display unit 20 is adhered and fixed to the panel 10. Accordingly, rigidity of the vibration plate 100 is higher in a lower portion 100b thereof than in an upper portion 100a thereof. The above structure makes it possible to cause a larger vibration in the upper portion 100a of the vibration plate 100 that is attached with the piezoelectric element 30 than in the lower portion 100b of the vibration plate 100, compared to the case of FIG. 5 not having the display unit 20. As a result, sound leakage resulting from the vibration in the lower portion 100b of the vibration plate 100 that is not in contact with the user's ear is reduced in the lower 100b of the vibration plate 100. For example, when the panel 10 has the rectangular shape, the panel 10 tends to be bent in the longitudinal direction thereof, and the vibration is difficult to attenuate. However, by increasing rigidity of the vibration plate 100 by adhesion of the display unit 20, attenuation of the vibration is increased, and the vibration in the lower portion of the vibration plate 100 may be reduced. Consequently, as illustrated in FIG. 3A, for example, even when the microphone 42 is provided in a lower part of the vibration plate 100 (i.e. near one end of the vibration plate 100 that opposes, across the display unit 20, another end thereof provided with the piezoelectric element 30), sound leakage due to the vibration in the lower portion of the vibration plate 100 is less likely to be collected. The vibration plate 100 in the upper portion thereof is bent directly by the piezoelectric element 30, and the vibration in the lower portion is attenuated compared to the vibration in the upper portion. The vibration plate 100 is bent by the piezoelectric element 30 such that a portion of the vibration plate 100 directly above the piezoelectric element 30 protrudes relative to neighboring portions of the vibration plate 100 in a long-side direction of the piezoelectric element 30.

Note that an area which includes a joining portion for joining the piezoelectric element and to which the display unit 20 is not joined has a width of from 0.5 cm to 5 cm in a first direction extending from the joining portion for the piezoelectric element 30 included in the above area to an area where the display unit 20 is joined. With the above structure, it is enabled that the area not to reduce the vibration has a sufficient size and that the electronic device is not oversized in a plane-view direction.

As described above, in the first embodiment, the housing 60 and the vibration plate 100 are integrally configured by disposing the vibration plate 100 of the electronic device 1 on the front surface of the housing 60. Besides, the display unit 20 and the piezoelectric element 30 are adhered to the panel 10 and housed within the housing 60. Accordingly, portability of the electronic device is improved, and the risk of damage to the vibration body (i.e. the vibration plate) is reduced, compared to an electronic device provided with the vibration body protruding from the outer surface of the housing. Furthermore, by adhering and fixing the display unit 20 to the panel 10, rigidity of the vibration plate 100 is increased without using an additional member. As a result, sound leakage resulting from the vibration in the lower portion of the vibration plate 100 is reduced, and usability is improved.

Second Embodiment

Figure 6A:
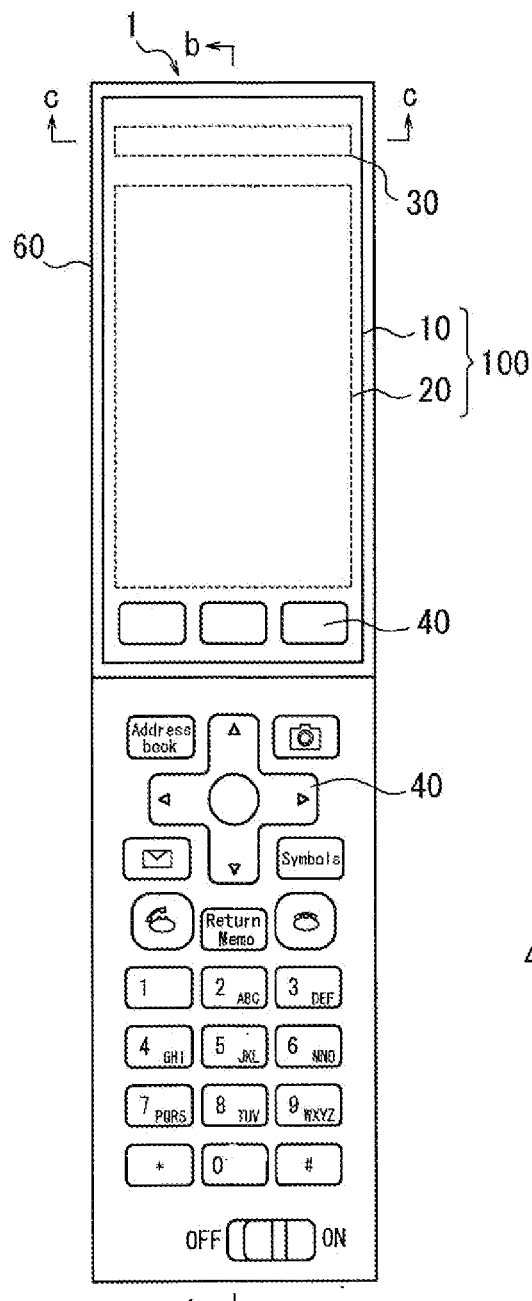
FIGS. 6A and 6B illustrate a housing structure of an electronic device according to yet another embodiment.
Figure 6B:
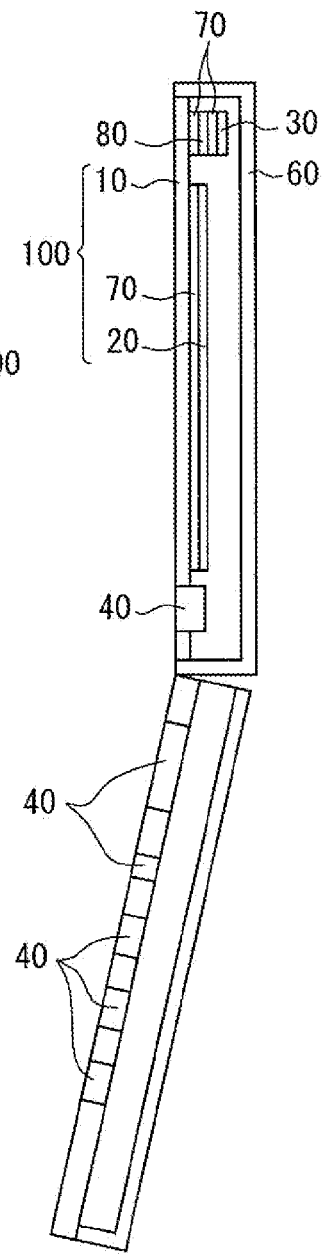
Figure 6C:
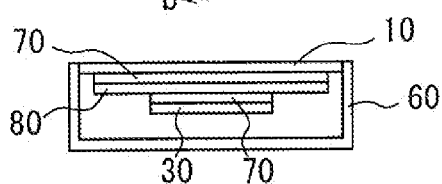

FIGS. 6A and 6B illustrate the housing structure of the electronic device 1 according to a second embodiment. FIG. 6A is a front view, FIG. 6B is a sectional view taken along a line b-b of FIG. 6A, and FIG. 6C is a sectional view taken along a line c-c of FIG. 6A. The electronic device 1 illustrated in FIGS. 6A and 6B is a foldable mobile phone in which the vibration plate 100, which includes the display unit 20 and a cover panel 10 (e.g. an acrylic plate) configured to protect the display unit 20, is provided on a front surface of an upper portion of the housing 60. The display unit 20 is joined to the panel 10 by the joining member 70. In the second embodiment, a reinforcing plate 80 is disposed between the panel 10 and the piezoelectric element 30. The reinforcing plate 80 may be a resin plate, a metal plate, or a plate including glass fiber, for example. That is to say, the electronic device 1 according to the second embodiment has a structure where the piezoelectric element 30 and the reinforcing plate 80 are adhered by the joining member 70, and the reinforcing plate 80 and the panel 10 are adhered by the joining member 70.

By disposing the reinforcing plate 80 between the piezoelectric element 30 and the panel 10, when the vibration plate 100 is applied with an external force, for example, the applied external force is less likely to be transferred to the piezoelectric element 30 and damage the piezoelectric element 30. Even when the vibration plate 100 is forcefully pressed against the human body, attenuation in the vibration of the vibration plate 100 is reduced. Moreover, owing to the reinforcing plate 80 disposed between the piezoelectric element 30 and the panel 10, a resonance frequency of the panel 10 is lowered, and a more preferable acoustic characteristic in a low frequency band is obtained. Note that instead of the reinforcing plate 80 a plate-shaped weight may be attached to the piezoelectric element 30 by the joining member 70.

Although the present invention has been described based on the drawings and the embodiments thereof, it should be noted that a person skilled in the art may easily make a variety of modifications and alterations according to the present disclosure. Note that the modifications and alterations are within the scope of the present invention. For example, functions and the like included in the components and steps may be rearranged as long as the functions and the like are logically consistent. A plurality of component parts, the steps, and the like may also be integrated or separated.

For example, the piezoelectric element unit 30 may be disposed in a middle of the panel 10. When the piezoelectric element 30 is disposed in the middle of the panel 10, the vibration of the piezoelectric element 30 is evenly transmitted to the whole vibration plate 100, thereby improving a quality of air conduction sound and allowing the user to perceive bone conduction sound even when the user places the ear in contact with the vibration plate 100 at different positions of the vibration plate 100. Note that, similarly to the first embodiment, the piezoelectric element 30 may be provided in plurality. In this case also, the display unit 20 is adhered and fixed to the panel 10. By doing so, rigidity of other portions of the vibration plate 100 than the joining portion with the piezoelectric element 30 is increased, and attenuation of the vibration is increased. As a result, sound leakage resulting from the vibration is reduced.

Although in the above electronic device 1 the piezoelectric element 30 is adhered to the panel 10, the piezoelectric element 30 may be attached to another place than the panel 10. For example, the piezoelectric element 30 may be adhered to a battery lid (a lid portion) that is configured to be attached to the housing 60 to cover a battery (e.g. a rechargeable battery). In this case, the battery lid corresponds to the vibration plate. Since the battery lid is often attached to a surface different from the panel 10 in the electronic device 1 such as the mobile phone, the above structure enables the user to listen to sound by placing a portion of the body (e.g. the ear) in contact with the surface different from the panel 10. In this case, it is preferable in terms of efficient transmission of bone conduction sound that the battery lid has a length in a longitudinal direction that is greater than or equal to the length from the antitragus to the inferior crus of antihelix and has a length in a short-side direction that is greater than or equal to the length from the tragus to the antihelix. When the battery lid is configured to have lower rigidity in a first area including a portion where the piezoelectric element is joined than in a second area located further away from the piezoelectric element than the first area is, the vibration from the first area to the second area is attenuated, and sound leakage resulting from the vibration is reduced. Rigidity of the second area may be increased for example by setting a thickness of the second area to be greater than a thickness of the first area in the battery lid or by joining another member (e.g. a member for holding the battery) to the second area.

Thus, according to the above embodiments, portability of the electronic device is improved, and favorable usability is provided.

REFERENCE SIGNS 1 electronic device
10 panel
20 display unit
30 piezoelectric element
40 input unit
50 control unit
60 housing
70 joining member
80 reinforcing member
90 support portion
100 vibration plate

The invention claimed is:

1. An electronic device comprising: a piezoelectric element; a vibration plate to which the piezoelectric element is joined for vibration; and a housing to which the vibration plate is joined, wherein sound is transmitted by bending the vibration plate with the piezoelectric element such that a portion of the vibration plate directly above the piezoelectric element protrudes relative to neighboring portions of the vibration plate in a long side direction of the piezoelectric element and by vibrating a contacting part of a human body that is in contact with the bent vibration plate, and wherein the vibration plate includes, in a plan view thereof, a first area including a joining portion with the piezoelectric element and a second area located further away from the joining portion than the first area is, and rigidity in the first area is lower than rigidity in the second area, and wherein the vibration occurs in an area of the vibration plate that is larger than an area having a length corresponding to a distance from a helix to a tragus and an antitragus, and a width corresponding to a distance from a crus helicis to an antihelix of an ear of the human body.

2. The electronic device of claim 1, wherein
the vibration plate includes two panels configured to be joined together, and
a joining portion of the panels is located in the second area.

3. The electronic device of claim 2, wherein
one of the two panels comprises a display panel, and another one of the two panels comprises a touch panel or a protection panel disposed on an opposite side of the housing relative to the display panel.

4. The electronic device of claim 1, wherein
a length of the vibration plate is greater than or equal to a length from an antitragus to an inferior crus of antihelix in a first direction extending from the joining portion with the piezoelectric element included in the first area to the second area.

5. The electronic device of claim 1, wherein
a length of the vibration plate is greater than or equal to a length from a tragus to an antihelix in a second direction intersecting with the first direction extending from the joining portion with the piezoelectric element included in the first area to the second area.

6. The electronic device of claim 1, wherein
the piezoelectric element is joined to the vibration plate by a joining member.

7. The electronic device of claim 6, wherein
the joining member comprises a non-thermosetting adhesive agent.

8. The electronic device of claim 6, wherein
the joining member comprises a double-sided adhesive tape.

9. The electronic device of claim 1, wherein
the vibration plate is joined to the housing by a joining member.

10. The electronic device of claim 9, wherein
the joining member comprises a non-thermosetting adhesive agent.

11. The electronic device of claim 9, wherein
the joining member comprises a double-sided adhesive tape.

12. The electronic device of claim 1, wherein
the vibration plate forms a part or an entirety of any of a display unit, an input unit, a cover of the display unit, and a lid portion that allows a battery to be detachable.

13. The electronic device of claim 3, wherein
the joining portion with the piezoelectric element in the vibration plate is located outside of an area where the touch panel covers the display panel.

14. The electronic device of claim 1, wherein
the first area has a width of from 0.5 cm to 5 cm in the first direction extending from the joining portion with the piezoelectric element included in the first area to the second area.

15. The electronic device of claim 1, wherein
the vibration plate includes, in areas thereof that are vibrated, a plurality of portions that are configured to be vibrated in a direction intersecting with a surface of the vibration plate, and in each of the plurality of portions, a value indicating amplitude of the vibration transitions over time from plus to minus or vice versa.

16. The electronic device of claim 1, wherein
the vibration plate is larger than an ear.

17. The electronic device of claim 1, wherein
the vibration plate comprises a panel for display.

18. The electronic device of claim 17, wherein
the piezoelectric element is disposed outside of a display area provided for a display function.

19. The electronic device of claim 1, wherein
the piezoelectric element is joined to one end portion of the vibration plate.

20. An electronic device comprising: a piezoelectric element; a vibration plate to which the piezoelectric element is joined for vibration; and a housing to which the vibration plate is joined, wherein sound is transmitted by bending the vibration plate with the piezoelectric element such that a portion of the vibration plate directly above the piezoelectric element protrudes relative to neighboring portions of the vibration plate in a long side direction of the piezoelectric element and by vibrating a pressed part of a human body that is pressed against the bent vibration plate, and wherein the vibration plate includes, in a plan view thereof, a first area including a joining portion with the piezoelectric element and a second area located further away from the joining portion than the first area is, and rigidity in a first area is lower than rigidity in the second area, and wherein the vibration occurs in an area of the vibration plate that is larger than an area having a length corresponding to a distance from a helix to a tragus and an antitragus, and a width corresponding to a distance from a crus helicis to an antihelix of an ear of the human body.

21. The electronic device of claim 20, wherein, when pressed with force greater than or equal to 3 N, the pressed part is vibrated, and sound is transmitted.

22. An electronic device comprising:
a piezoelectric element;
a vibration plate to which the piezoelectric element is joined for vibration; and
a housing to which the vibration plate is joined, wherein
sound is transmitted by bending the vibration plate with the piezoelectric element such that a portion of the vibration plate directly above the piezoelectric element protrudes relative to neighboring portions of the vibration plate in a long side direction of the piezoelectric element and by vibrating a contacting part of a human body that is in contact with the bent vibration plate, and wherein
the vibration plate includes a first area including a joining portion with the piezoelectric element, and vibration amplitude of the vibration plate is smaller in a location of the vibration plate that is farther away from the first area, and wherein the vibration occurs in an area of the vibration plate that is larger than an area having a length corresponding to a distance from a helix to a tragus and an antitragus, and a width corresponding to a distance from a crus helicis to an antihelix of an ear of the human body.

23. The electronic device of claim 22, wherein
the vibration plate includes, in a plan view thereof, the first area including the joining portion with the piezoelectric element and a second area located further away from the joining portion than the first area is, and rigidity in the first area is lower than rigidity in the second area.

* * * * *